US008687509B2

(12) United States Patent
Choi et al.

(10) Patent No.: US 8,687,509 B2
(45) Date of Patent: Apr. 1, 2014

(54) METHOD FOR BEAMFORMING

(75) Inventors: In-Kyeong Choi, Daejeon (KR); Dong Seung Kwon, Daejeon (KR); Ji Won Kang, Incheon (KR); Chung Yong Lee, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 663 days.

(21) Appl. No.: 12/735,143

(22) PCT Filed: Aug. 29, 2008

(86) PCT No.: PCT/KR2008/005099
§ 371 (c)(1),
(2), (4) Date: Jun. 17, 2010

(87) PCT Pub. No.: WO2009/078541
PCT Pub. Date: Jun. 25, 2009

(65) Prior Publication Data
US 2011/0122782 A1 May 26, 2011

(30) Foreign Application Priority Data
Dec. 17, 2007 (KR) .................. 10-2007-0132624

(51) Int. Cl.
*H04B 7/216* (2006.01)
(52) U.S. Cl.
USPC ............ 370/252; 370/328; 370/329; 370/335
(58) Field of Classification Search
USPC .................................. 455/103, 504
See application file for complete search history.

(56) References Cited

U.S. PATENT DOCUMENTS

| 5,634,199 | A | 5/1997 | Gerlach et al. | |
| 7,627,347 | B2* | 12/2009 | Codreanu et al. | 455/562.1 |
| 8,095,185 | B2* | 1/2012 | Stephenne | 455/562.1 |
| 2005/0032521 | A1* | 2/2005 | Lee et al. | 455/450 |
| 2005/0286650 | A1* | 12/2005 | Han et al. | 375/267 |
| 2007/0177681 | A1* | 8/2007 | Choi et al. | 375/260 |
| 2008/0304464 | A1* | 12/2008 | Borkar et al. | 370/342 |
| 2009/0252240 | A1* | 10/2009 | Kwon et al. | 375/260 |
| 2009/0279486 | A1* | 11/2009 | Kishigami et al. | 370/329 |

FOREIGN PATENT DOCUMENTS

| EP | 1259008 | 11/2002 |
| EP | 1732245 | 12/2006 |
| KR | 10-0659725 | 12/2006 |

(Continued)

OTHER PUBLICATIONS

International Search Report and Written Opinion of International Searching Authority dated Feb. 23, 2009 in relation to International Application No. PCT/KR2008/005099.

(Continued)

*Primary Examiner* — Hassan Kizou
*Assistant Examiner* — Amy Ling

(57) ABSTRACT

The present invention relates to a method for random beamforming based on a codebook. The method includes generating a first random variable corresponding to a Gaussian distribution; generating a second random variable corresponding to a uniform distribution; generating a plurality of beam elements by using the first variable, the second variable, spatial correlation between channels, and indexes of transmitting antennas; and forming a beam by using the plurality of beam elements.

15 Claims, 4 Drawing Sheets

(56) References Cited

FOREIGN PATENT DOCUMENTS

| KR | 10-0835285 | 5/2008 |
|---|---|---|
| KR | 10-2009-0028170 | 3/2009 |
| WO | WO 2008/069427 A1 | 6/2008 |
| WO | WO 2009/035284 A2 | 3/2009 |

OTHER PUBLICATIONS

Il-Min Kim, et al.: "Opportunistic Beamforming Based on Multiple Weighting Vectors", IEEE Transactions on Wireless Communications, vol. 4, No. 6, Nov. 2005, pp. 2683-2687.

Pramod Viswanath, et al.: "Opportunistic Beamforming Using Dumb Antennas", IEEE Trans. on Information Theory, Sep. 11, 2001, pp. 1-40.

Jiwon Kang, et al.: "An Opportunistic Beamforming Technique Using a Quantized Codebook", IEEE VTC 2007, Spring, pp. 1647-1651, Apr. 2007.

Il-Min Kim, et al.: "Improved Opportunistic Beamforming in Ricean Channels", IEEE Trans. on Communications, vol. 54, No. 12, Dec. 2006, pp. 2199-2211.

Jiwon Kang, et al.: "Parameter Designs for COBF Based on Kappa-factor Channel Model", Journal of IEEK, pp. 981-986.

Jiwon Kang et al, "Parameter Design for COBF Based on Kappa-factor Channel Model", Journal of IEEK, pp. 981-986, Dec. 25, 2008.

Notice of Office Action dated Jan. 28, 2014 in connection with Korean Application No. 10-2007-0132624, 9 pages.

\* cited by examiner

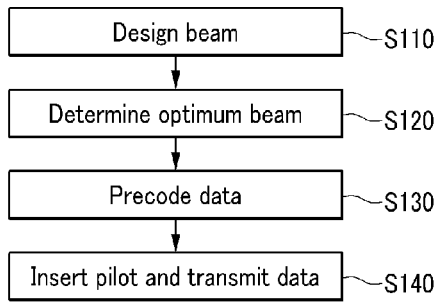
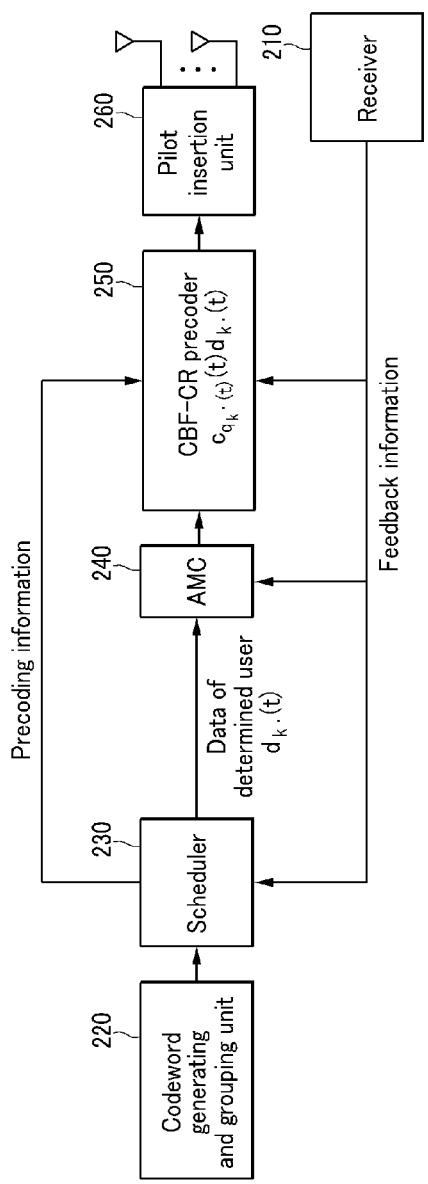

METHOD FOR BEAMFORMING

CROSS-REFERENCE TO RELATED APPLICATION(S)

The present application is related to International Application No. PCT/KR2008/005099 filed Aug. 29, 2008 entitled "METHOD FOR BEAMFORMING" which claims priority to Korean Patent Application No. 10-2007-0132624 filed Dec. 17, 2007. International Application No. PCT/KR2008/005099 is assigned to the assignee of the present application and is hereby incorporated by reference into the present disclosure as if fully set forth herein. The present application hereby claims priority under 35 U.S.C. §119(a) to International Patent Application No. PCT/KR2008/005099 and Korean Patent Application No. 10-2007-0132624.

TECHNICAL FIELD

The present invention relates to a method for beamforming, and more particularly, to a method for random beamforming based on a codebook.

BACKGROUND ART

Multiuser diversity is one of diversities caused by independently time-varying a channel environment between users in a wireless communication system. Multiuser diversity gain is obtained by allocating a resource when a channel of each user reaches the best condition through scheduling during observation of a change of a channel of each user. As the change of the channel is increased, the diversity gain is increased. Accordingly, the diversity gain is limited under a channel environment where the change of the channel is small or slow. Under the above-mentioned environment, the diversity gain is generated by inducing a large and quick change of the channel using multiple transmission antennas. This method is called opportunistic beamforming (hereinafter referred to as "OBF") or random beamforming.

OBF technology is limited to the diversity thereof under an environment corresponding to a small number of users, since it uses only one beam to search an optimal user at each time slot. Therefore, technologies that generate multibeams and select an optimal beam of each user to increase multiuser diversity gain, have been proposed in order to overcome the above-mentioned limitation. As these technologies in the related art, there are codebook-based opportunistic beamforming (hereinafter referred to as "COBF") and codebook-based beamforming with code rotation (hereinafter referred to as "CBF-CR"), where the codebook contains multiple vectors used for multibeams.

The COBF uses a pilot only for channel estimation, and allows each user to estimate a channel. A base station receives from each user the maximum beam index and channel quality information (hereinafter referred to as "CQI") corresponding to the beam, as feedback. Then, the base station performs scheduling by allocating a user having the maximum gain to each beam thereof, and transmits data. In the COBF method, a unitary matrix varying with time is multiplied by one of beam vectors in codebook, so that a beam varying with time is obtained. The COBF has a merit in that a pilot is fixed to a pilot used for channel estimation and a selective diversity effect is thus increased to infinity.

The CBF-CR generates multiple codebooks by grouping large-sized codebooks and then obtains multiple beams that vary with time by diversely using the codebooks with change of time. Therefore, the same effect as the COBF method is obtained in the CBF-CR.

In the COBF, multibeams have been obtained by multiplying unitary matrices, which vary with time, by beam vectors of one codebook. In contrast, in the CBF-CR, multibeams are obtained by generating multiple codebooks, and then using the codebook while exchanging the codebook with time.

However, the method of designing a beam and the method of designing a beam parameter in the related art have a problem in that performance deteriorates.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for beamforming that designs a beam according to correlation between channels for a method for random beamforming based on a codebook.

Technical Solution

An exemplary embodiment of the present invention provides a method for beamforming of a base station. The method includes: generating a first random variable corresponding to a Gaussian distribution; generating a second random variable corresponding to a uniform distribution; generating a plurality of beam elements by using the first variable, the second variable, spatial correlation between channels, and indexes of transmitting antennas; and forming a beam by using the plurality of beam elements.

Another embodiment of the present invention provides a method for beamforming of a base station. The method includes: generating a first random variable corresponding to a Gaussian distribution; generating a second random variable corresponding to a uniform distribution; generating a plurality of codeword elements by using the first variable, the second variable, spatial correlation between channels, and indexes of transmitting antennas; generating a codeword by using the plurality of codeword elements; and repeatedly performing the generating of the first random variable, the generating of the second random variable, the generating of the plurality of codeword elements, and the generating of the codeword, thereby generating a plurality of codewords.

Yet another embodiment of the present invention provides a method for beamforming of a base station. The method includes: generating a first random variable corresponding to uniform distribution; generating a plurality of codewords by using the first random variable and indexes of transmitting antennas; generating a second random variable corresponding to a uniform distribution; generating a third random variable corresponding to a Gaussian distribution; and forming a plurality of matrices by using the second random variable, the third random variable, spatial correlation between channels, and the indexes of the transmitting antennas.

Advantageous Effects

As described above, according to the present invention, a beam is designed according to the correlation between the channels. Therefore, it is possible to optimize the performance of the method for random beamforming that includes a COBF method and a CBF-CR method.

BRIEF DESCRIPTION OF THE DRAWINGS

FIG. 1 is a flowchart illustrating a method for beamforming according to a first exemplary embodiment of the present invention.

FIG. 2 is a schematic block diagram of an apparatus for beamforming using a CBF-CR method according to a second exemplary embodiment of the present invention.

MODE FOR THE INVENTION

Figure 3:
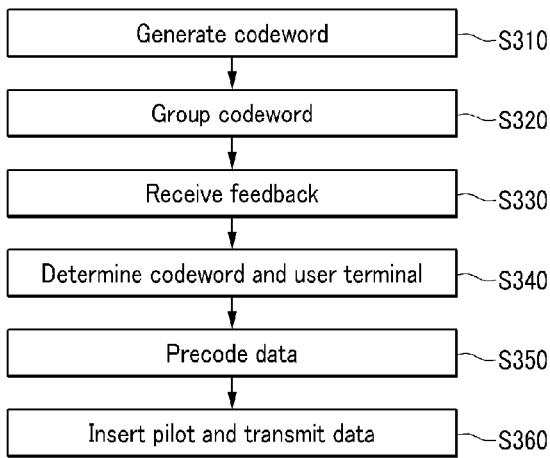
FIG. 3 is a flowchart illustrating a method for beamforming according to a second exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms "-er", "-or", and "module" described in the specification mean units for processing at least one function and operation and can be implemented by hardware components or software components and combinations thereof.

First, a method of designing a beam according to a first exemplary embodiment of the present invention and a method for beamforming using the beam will be described in detail with reference to FIG. 1. FIG. 1 is a flowchart illustrating a method for beamforming according to a first exemplary embodiment of the present invention. A method of designing a beam for random beamforming and a method for beamforming using the beam will be described in the first exemplary embodiment of the present invention.

First, a base station designs a beam (S110).

A method for random beamforming uses temporally different beams, and adds selective diversity for allowing a user to select one from a plurality of beams in order to supply insufficient multiuser diversities.

When a single stream is transmitted instantaneously, the q-th beam at a time t is represented by Equation 1.

$$w_q(t) = [w_{1,q}(t) w_{2,q}(t) \ldots w_{M_t,q}(t)]^T \quad \text{(Equation 1)}$$

Here, $w_q(t)$ indicates the q-th beam at a time t, and $M_t$ indicates the number of antennas of a transmitting terminal.

Further, a channel at a time t is represented by Equation 2.

$$h(t) = [h_1(t) \ldots h_{M_t}(t)]^T \quad \text{(Equation 2)}$$

Here, h(t) indicates a channel at a time t.

When the spatial correlation between channels is very high and a linear array is used, each element of the channel h(t) is modeled by Equation 3.

$$h_m(t) = h_1(t)\exp\left(j(m-1)\frac{2\pi d}{\lambda}\cos\phi(t)\right) \quad \text{(Equation 3)}$$

Here, d indicates an interval between antennas, λ indicates a wavelength, m indicates an index of a transmitting antenna, and φ(t) indicates an angle of departure AoD.

When there is no spatial correlation between the channels, the channels have independent identically distributed (hereinafter referred to as "i.i.d.") characteristics due to countless scatters. Further, it has been generally known that the channels have an i.i.d. complex Gaussian distribution. Therefore, each element of the channel h(t) is modeled by Equation 4.

$$h_m(t) \sim CN(0, E\{\|h_m(t)\|^2\}) \quad \text{(Equation 4)}$$

Here, CN(x,y) indicates a complex Gaussian distribution that has an average of x and a variance of y.

The average sizes of all the channels are the same. Therefore, considering the normalized channel $h'_m(t) = h_m(t)/\|h_m(t)\|$, if the spatial correlation is very high, each element of the normalized channel is modeled by Equation 5.

$$h'_{m,uncor}(t) = \exp\left(j(m-1)\frac{2\pi d}{\lambda}\cos\phi(t)\right) \quad \text{(Equation 5)}$$

If there is no spatial correlation, each element of the normalized channel is modeled by Equation 6.

$$h'_{m,cor}(t) \sim CN(0,1) \quad \text{(Equation 6)}$$

If it is assumed that the spatial correlation between the channels is ρ in the range of 0 to 1, each element of the channel is modeled by Equation 7 using Equations 5 and 6.

$$h'_m(t) = \sqrt{1-\rho}\, h'_{m,uncor}(t) + \sqrt{\rho}\, h'_{m,cor}(t) \quad \text{(Equation 7)}$$

A case where the spatial correlation is a linear array has been exemplified in the first exemplary embodiment of the present invention. However, even if other arrays are used, it is possible to design a beam in the same manner.

In order to maximize the performance of the random beamforming, a beam should be designed so that the beam and the channel have the maximum gain, that is, perform maximum ratio combining on a scheduled user's position. In this case, the beam becomes a conjugate matrix of the channel. Accordingly, each element of the beam is modeled by Equation 8.

$$w_{m,q}(t) = \sqrt{1-\rho}\, z_q(t) + \sqrt{\frac{\rho}{M_t}} \exp\left(j(m-1)\frac{2\pi d}{\lambda}\cos\phi_q(t)\right), \quad \text{(Equation 8)}$$

$$m = 1, \ldots, M_t$$

Here, there is $z_q(t) \sim CN(0,1/M_t)$ and an arbitrary random variable that has the distribution of $\phi_q(t) \sim U(0,2\pi]$. Here, U(x, y] means that distribution is uniform in a range that is larger than x and less than y.

The base station generates Q beams instantaneously and differently by Equation 8. Here, the electric power $\|w_q(t)\|^2$ of a transmission beam becomes 1 on average. There are many cases where the electric power of the beam should be instantaneously maintained in some systems. In these cases, $w_q(t)$ is generated using Equation 8 and then normalized, or the elements of the beam until the $M_t$-1-th element are generated using Equation 8 and the $M_t$-th element may then be obtained by subtracting the electric power of 1st to $M_t$-1 th elements from 1.

Equation 8 may be applied to any kind of beamforming using the random beamforming.

The base station determines the optimum beam from the Q beams (S120), multiplies data to be transmitted by the optimum beam to precode the data to be transmitted (S130), inserts pilots into the precoded data to be transmitted, and transmits the data through a plurality of transmitting antennas (S140).

Next, a method of designing a beam according to a second exemplary embodiment of the present invention and a method and apparatus for beamforming using the beam will be described in detail with reference to FIGS. 2 and 3. A method of designing a beam for a CBF-CR method and a method and apparatus for beamforming using the beam will be described in the second exemplary embodiment of the present invention.

FIG. 2 is a schematic block diagram of an apparatus for beamforming using a CBF-CR method according to a second exemplary embodiment of the present invention.

As shown in FIG. 2, an apparatus for beamforming for a CBF-CR method according to the second exemplary embodiment of the present invention includes a receiver 210, a codeword generating and grouping unit 220, a scheduler 230, an adaptive modulator and coder (AMC) 240, a CBF-CR precoder 250, and a pilot insertion unit 260.

The receiver 210 receives feedback information from each user terminal, and transmits the feedback information to the scheduler 230, the AMC 240, and the CBF-CR precoder 250. The feedback information includes indexes of codewords selected by each of the users and channel quality information (CQI).

The codeword generating and grouping unit 220 generates a plurality of codewords, and groups a plurality of codewords to generate a plurality of small codebooks. The scheduler 230 determines the optimum codeword and the optimum user terminal by using the feedback information of the user terminals, and the AMC 240 performs the modulation and coding of data to be transmitted.

The CBF-CR precoder 250 multiplies the data, which is to be transmitted to the optimum user terminal, by the optimum code vector to perform precoding. The pilot insertion unit 260 inserts pilots into the output values of the CBF-CR precoder 250, and then transmits the output values through a plurality of transmitting antennas.

FIG. 3 is a flowchart illustrating a method for beamforming according to a second exemplary embodiment of the present invention.

The base station generates the codewords (S310).

The CBF-CR generate N codebooks by grouping the plurality of codewords by Q and diversely uses the codebooks with change of time. Accordingly, the number of all the codewords is N*Q, and is represented by Equation 9.

$$c_{n,q}, n=1,\ldots,N, q=1,\ldots,Q \quad \text{(Equation 9)}$$

The base station uses $c_{mod(t,N)+1,q}$ as the q-th beam $w_q(t)$ at a time t. Mod(x, y) means the remainder when x is divided by y.

Accordingly, $w_q(t)=c_{mod(t,N)+1,q}$ is satisfied. Therefore, when Equation 8 is used, the m-th element of the codeword vector $c_{n,q}$ is modeled by Equation 10.

$$c_{n,q}\{m\} = \sqrt{1-\rho}\, z_{n,q} + \sqrt{\frac{\rho}{M_t}} \exp\left(j(m-1)\frac{2\pi d}{\lambda}\cos\phi_{n,q}\right), \quad \text{(Equation 10)}$$

$$m = 1, \ldots, M_t$$

Here, there is $z_{n,q} \sim CN(0,1/M_t)$ and $\phi_{n,q} \sim U(0,2\pi]$.

The base station generates N*Q codewords instantaneously and differently by Equation 10.

The base station groups the generated codewords by Q (S320) to generate N codebooks.

The base station receives feedback from the user terminals (S330). The feedback include indexes $q_k^*(t)$ of codewords selected by the user terminal and CQI when precoding is performed using the selected codewords.

The base station scheduler 230 determines the optimum codeword and the optimum user terminal by using the feedback information of the user terminals (S340). The CBF-CR precoder 250 of the base station multiplies the data $d_k^*(t)$ of the optimum user terminal by the optimum codeword $c_{q^*_k(t)}(t)$ to precode the data of the optimum user terminal (S350).

The pilot insertion unit 260 inserts pilots into the precoded data, and then transmits the data through a plurality of transmitting antennas (S360).

Next, a method of designing a beam according to a third exemplary embodiment of the present invention and a method and apparatus for beamforming using the beam will be described in detail with reference to FIGS. 4 and 5. A method of designing a beam for a COBF method and a method and apparatus for beamforming using the beam will be described in the third exemplary embodiment of the present invention.

Figure 4:
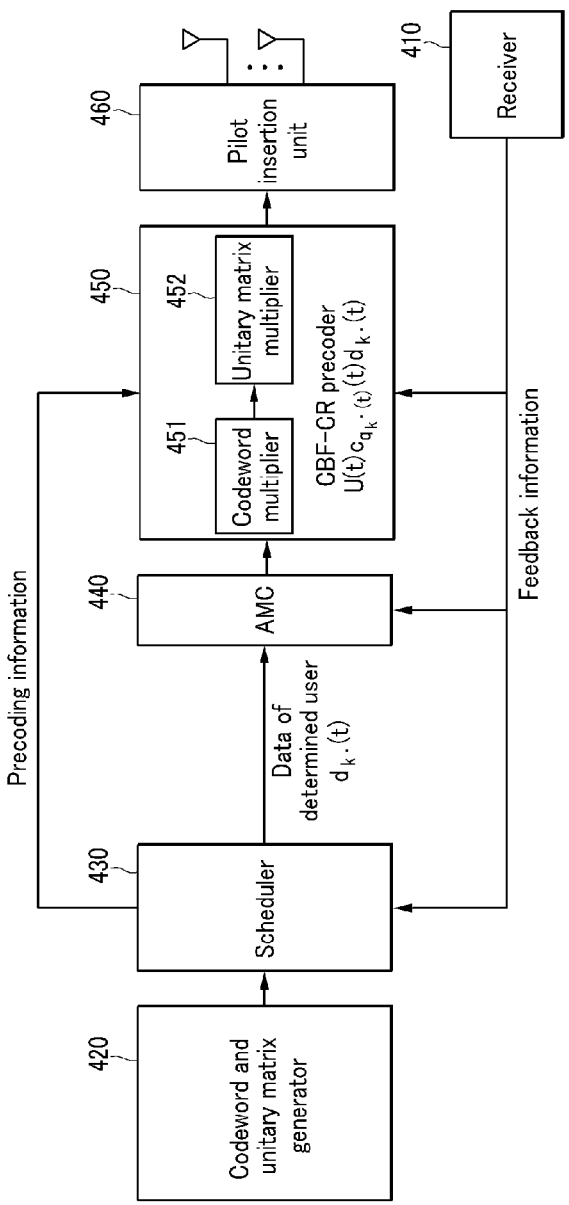
FIG. 4 is a schematic block diagram of an apparatus for beamforming using a COBF method according to a third exemplary embodiment of the present invention.

FIG. 4 is a schematic block diagram of an apparatus for beamforming using a COBF method according to a third exemplary embodiment of the present invention.

As shown in FIG. 4, a COBF apparatus according to the third exemplary embodiment of the present invention includes a receiver 410, a codeword and unitary matrix generator 420, a scheduler 430, an adaptive modulator and coder (AMC) 440, a COBF precoder 450, and a pilot insertion unit 460.

The receiver 410 receives feedback information from each user terminal, and transmits the feedback information to the scheduler 430, the AMC 440, and the COBF precoder 450. The feedback information includes indexes $q_k^*(t)$ of codewords selected by each of the users and a CQI (SINR or data rate).

The codeword and unitary matrix generator 420 generates a plurality of codewords, and generates a plurality of unitary matrices to design a beam. The scheduler 430 determines the optimum codeword and the optimum user terminal by using the feedback information of the user terminals, and the AMC 440 performs the modulation and coding of data to be transmitted.

The COBF precoder 450 multiplies the data, which is to be transmitted to the optimum user terminal, by the optimum code vector and the unitary matrix to perform precoding. The pilot insertion unit 460 inserts pilots into the precoded data, and then transmits the data through a plurality of transmitting antennas.

Figure 5:
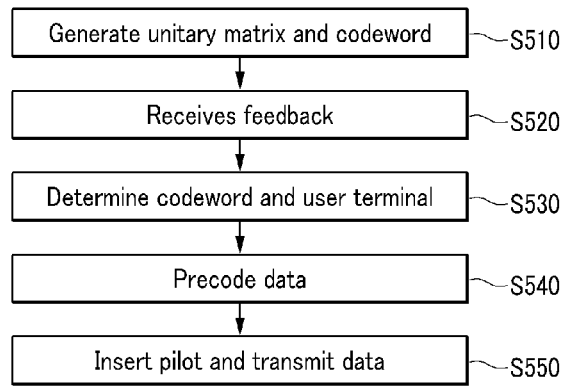
FIG. 5 is a flowchart illustrating a method for beamforming according to the third exemplary embodiment of the present invention.

FIG. 5 is a flowchart illustrating a method for beamforming according to the third exemplary embodiment of the present invention.

The base station generates codewords and unitary matrices (S510).

Among beams of a COBF method, the q-th beam $U(t)c_q$ at a time t is generated by multiplying Q codewords $c_q=[c_q\{1\}, c_q\{2\}, \ldots c_q\{M_t\}]$ (q=1, 2, ... Q) by a random unitary matrix U(t) of a predetermined pattern. Since U(t) should be known at transmitting/receiving terminals, N unitary matrices are actually generated and repeatedly used. If it is assumed that the n-th unitary matrix is $U_n$, $U(t)c_q$ becomes the form of $U_{mod(t,N)+1}c_q$.

The beam of the COBF method is in the form of $w_q(t) = U_{mod(t,N)+1}C_q$. Accordingly, if Equation 8 is applied to the COBF method, $U_n$ and $c_q$ may be determined by various methods. However, herein, it is difficult to design a beam so that a phase part of the beam has the optimum distribution. However, as an interval between the transmitting antennas is increased, the optimum distribution of the phase part becomes uniform. Therefore, the matrix $U_n$ and the codeword vector $c_q$ are designed using Equation 11.

$$U_n = \text{diag}[v_n], \quad c_q\{m\} = \frac{1}{\sqrt{M_t}} \exp(j(m-1)\beta_q) \quad \text{(Equation 11)}$$

Here, there are Q phases, and each element of a vector $v_n$ is represented by Equation 12.

$$v_n\{m\} = \sqrt{\rho} \exp(j(m-1)\theta_n) + \sqrt{1-\rho} z_n \quad \text{(Equation 12)}$$

Here, there are N phases and N phases.

If the matrix $U_n$ and the codeword vector $c_q$ are designed as described above, the m-th element of the beam $U_n c_q$ is represented by Equation 13.

$$\sqrt{\frac{\rho}{M_t}} \exp(j(m-1)(\theta_n + \beta_q)) + \sqrt{\frac{1-\rho}{M_t}} z_n \exp(j(m-1)\beta_q) \quad \text{(Equation 13)}$$

In this case, since the phase distribution of $z_n$ is uniform, the distribution of $z_n \exp(j(m-1)\beta_q)$ becomes CN (0, 1) like $z_n$. Accordingly, according to a comparison with Equation 8, only a phase part of a correlated part is changed to be uniform, and a probability density function (pdf) of $\|v_n\{m\}\|$ is represented by Equation 14. Therefore, it is possible to obtain a Ricean distribution that is a distribution of an envelope of the optimum $w_{m,q}(t)$.

$$f_a(z) = \frac{2z}{1-\rho} \exp\left\{-\frac{z^2+\rho}{1-\rho}\right\} I_0(2z\sqrt{\rho}) \quad \text{(Equation 14)}$$

According to one noticeable characteristic, an existing $U_n$ is a unitary matrix but the proposed $U_n$ is a non-unitary matrix. The reason to design a beam in a unitary matrix is to maintain transmission electric power. However, a non-unitary matrix has been used in the above-mentioned design, but transmission electric power is not increased on average due to the design of the codeword.

Even in this case, in order to make the system maintain instantaneous electric power to be constant, the normalization is forcibly performed so that the vector $v_n$ of the matrix $U_n$ has electric power $M_t$ or only the last element of the beam needs to be generated to have electric power that is obtained by subtracting the former electric power from the electric power $M_t$.

According to another characteristic, since the design of the proposed $U_n$ is a diagonal matrix, the number of parameters to be stored is small. Therefore, if the above-mentioned design is used, $(N+Q)M_t$ complex numbers should be stored in the case of the COBF, and $N*Q*M_t$ complex numbers should be stored in the case of the CBF-CR. For this reason, the COBF is advantageous in terms of required memory.

The base station receives feedback from the user terminals (S520). The feedback include indexes $q_k^*(t)$ of codewords selected by the user terminal and CQI when precoding is performed using the selected codewords.

The base station scheduler 430 determines the optimum codeword and the optimum user terminal by using the feedback information of the user terminals (S540). The COBF precoder 450 of the base station multiplies the data $d_{k^*}(t)$ of the optimum user terminal by the optimum codeword $c_{q^*_k(t)}(t)$ and the unitary matrix $U_n$ to precode the data of the optimum user terminal (S540).

The pilot insertion unit 460 inserts pilots into the precoded data, and then transmits the data through a plurality of transmitting antennas (S550).

Figure 6:
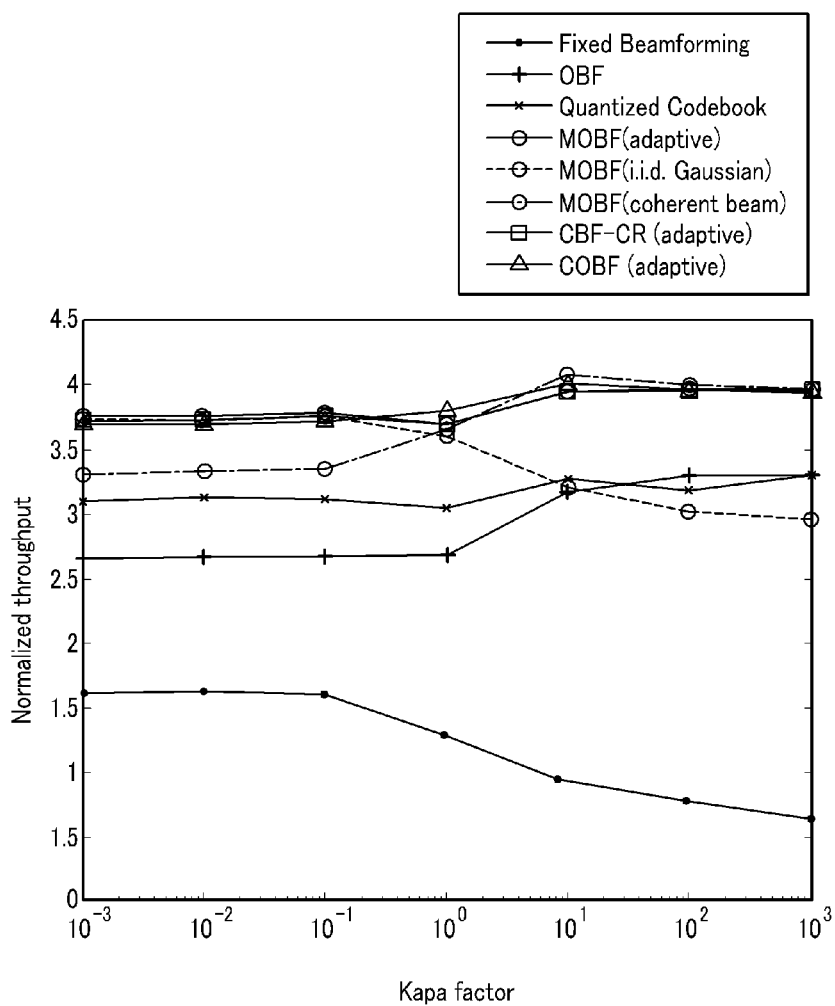
FIG. 6 is a graph showing the system capacity of the related art and the method for beamforming according to an exemplary embodiment of the present invention without regard to a pilot.

Hereinafter, the performance of the method for beamforming according to an exemplary embodiment of the present invention will be compared with the performance of the related art. FIG. 6 is a graph showing the system capacity of the related art and the method for beamforming according to an exemplary embodiment of the present invention without regard to a pilot, and FIG. 7 is a graph showing the system capacity of the related art and the method for beamforming according to an exemplary embodiment of the present invention with regard to a pilot.

In a simulation where the method for beamforming according to the exemplary embodiment of the present invention is compared with the related art, it was assumed that a channel was generated to be a Kapa factor model and to have a terminal speed of 1 km/h. The channel gains of users were set to be the same on average, and generally-used instantaneous electric power constraints were used. Further, it was assumed that a ratio of one pilot in one time slot was 3.7% and the maximum number of pilots required in the COBF and CBF-CR methods was as many as the number of transmitting antennas per time slot. A 3 bit codebook (Q=8) was used as a codebook, and it was assumed that the number of users was 10 and the number of transmitting antennas was 4.

Figure 7:
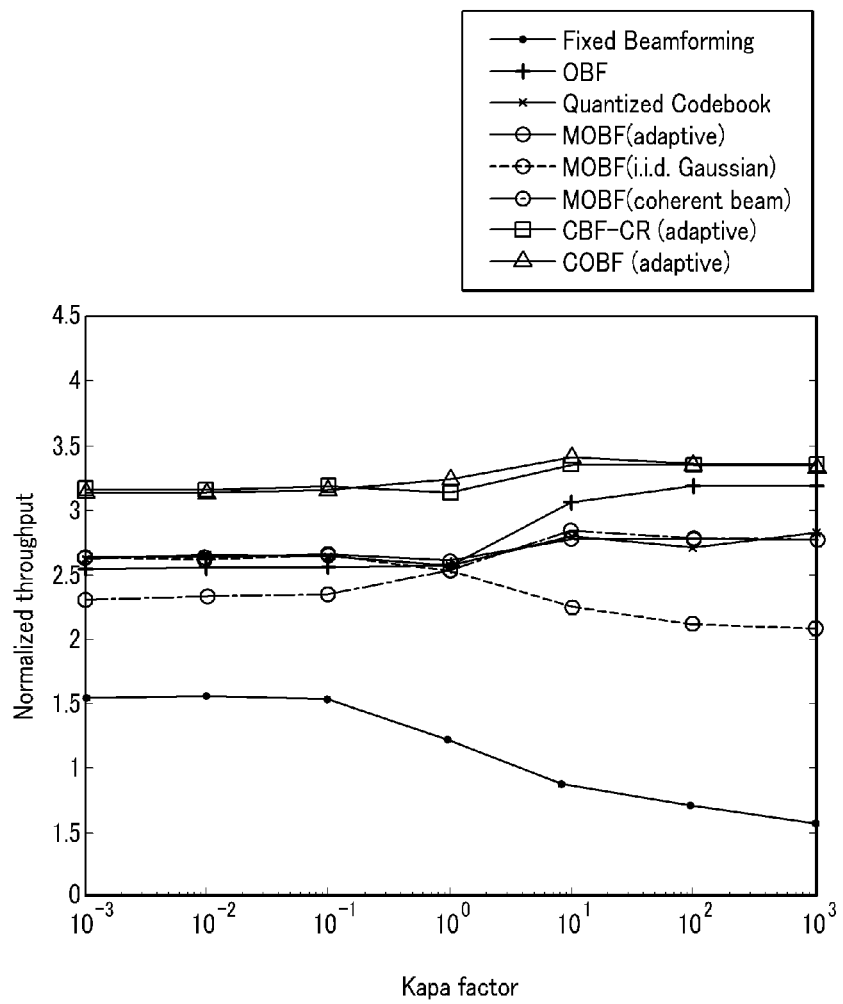
FIG. 7 is a graph showing the system capacity of the related art and the method for beamforming according to an exemplary embodiment of the present invention with regard to a pilot.

In FIGS. 6 and 7, a line represented as Fixed Beamforming is a line of a system that uses a fixed codebook, and a line represented as Quantized Codebook is a line of a system that uses only one codebook without code rotation in the CBF-CR method according to the second exemplary embodiment of the present invention.

A line represented as MOBF (i.i.d. Gaussian) is a line of MOBF where a beam is designed in an existing i.i.d. Gaussian form, a line represented as MOBF (coherent beam) is a line of MOBF where a beam is designed in the form of a coherent beam, and a line represented as MOBF (adaptive) is a line of MOBF where a beam is designed using the method of designing a beam according to the first exemplary em-bodiment of the present invention. According to the comparison between the performances of the MOBF (i.i.d. Gaussian), the MOBF (coherent beam), and the MOBF (adaptive), it can be seen that the performance of the MOBF (adaptive) is always excellent. That is, the MOBF (adaptive) always has the optimum performance regardless of spatial correlation.

Furthermore, the beam of the MOBF (adaptive) has the i.i.d. Gaussian form when the spatial correlation is very low, and has the form of the coherent beam when the spatial correlation is very high. Therefore, it can be seen that the graph of the MOBF (adaptive) is similar to the graph of the MOBF (coherent beam) when a Kapa factor is small, and the graph of the MOBF (adaptive) is similar to the graph of the MOBF (i.i.d. Gaussian) when a Kapa factor is large.

A line represented as CBF-CR (adaptive) is a line of CBF-CR where a beam is designed using the method of designing a beam according to the second exemplary embodiment of the present invention, and a line represented as COBF (adaptive) is a line of COBF where a beam is designed using the method of designing a beam according to the third exemplary embodiment of the present invention. Referring to FIGS. 6 and 7, it can be seen that the performances of the CBF-CR (adaptive) and the COBF (adaptive) are most excellent.

When a pilot is not regarded, the performance of the MOBF (adaptive) is similar to the performances of the CBF-CR (adaptive) and the COBF (adaptive) but a pilot overhead thereof is large. Therefore, it can be seen that the performance of the MOBF (adaptive) is low when a pilot is regarded.

The difference between the performances of the Fixed Beamforming method and the CBF-CR (adaptive)/COBF (adaptive) methods is a random beamforming effect, and the difference between the performances of the OBF method and the CBF-CR (adaptive)/COBF (adaptive) methods is a gain that is obtained by adding selective diversities of multibeams.

Since the random beamforming effect and the effect of the selective diversity addition are very large in the results of the simulation, it can be seen that the performances of the COBF and CBF-CR methods are excellent.

The above-mentioned exemplary embodiments of the present invention are not embodied only by a method and apparatus. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for beamforming of a base station, the method comprising:
   generating a first random variable corresponding to a Gaussian distribution;
   generating a second random variable corresponding to a uniform distribution;
   generating, by the base station, a plurality of beam elements by using the first random variable, the second random variable, spatial correlation between channels, and indexes of transmitting antennas;
   forming a beam by using the plurality of beam elements;
   repeatedly performing the generating of the first random variable, the generating of the second random variable, the generating of the plurality of beam elements, and the forming of the beam, thereby forming a plurality of beams;
   selecting an optimum beam from the plurality of beams;
   multiplying data to be transmitted by the optimum beam to precode the data to be transmitted; and
   inserting pilots into the precoded data to be transmitted and transmitting the data.

2. The method of claim 1, wherein a number of the beam elements is the same as that of the transmitting antennas.

3. The method of claim 1, further comprising normalizing the plurality of beam elements.

4. The method of claim 1, wherein one of the plurality of beam elements is generated using electric power of the rest of the beam elements except for the one of the plurality of beam elements.

5. The method of claim 1, further comprising:
   determining a value for the spatial correlation between the channels,
   wherein generating the plurality of beam elements comprises generating the plurality of beam elements based on an equation for beam element modeling element that includes the determined value and a combination of a first equation for channel element modeling where there is no spatial correlation between the channels with a second equation for channel element modeling where there is a high spatial correlation between the channels.

6. A method for beamforming of a base station, the method comprising:
   generating a first random variable corresponding to a Gaussian distribution;
   generating a second random variable corresponding to a uniform distribution;
   generating, by the base station, a plurality of codeword elements by using the first random variable, the second random variable, spatial correlation between channels, and indexes of transmitting antennas;
   generating a codeword by using the plurality of codeword elements;
   repeatedly performing the generating of the first random variable, the generating of the second random variable, the generating of the plurality of codeword elements, and the generating of the codeword, thereby generating a plurality of codewords;
   grouping the plurality of codewords to generate a plurality of codebooks;
   receiving feedback from a plurality of user terminals;
   determining an optimum codeword from the plurality of codewords by using the feedback, and determining an optimum user terminal from the plurality of user terminals;
   multiplying data, which is to be transmitted to the optimum user terminal, by the optimum codeword to precode the data to be transmitted; and
   inserting pilots into the precoded data to be transmitted and transmitting the data.

7. The method of claim 6, wherein the feedback includes indexes of codewords selected by the user terminals and channel quality information when precoding is performed using the selected codewords.

8. A method for beamforming of a base station, the method comprising:
   generating a first random variable corresponding to a uniform distribution;
   generating, by the base station, a plurality of codewords by using the first random variable and indexes of transmitting antennas;

generating a second random variable corresponding to a uniform distribution;

generating a third random variable corresponding to a Gaussian distribution;

forming a plurality of matrices by using the second random variable, the third random variable, spatial correlation between channels, and the indexes of the transmitting antennas;

forming a beam by using at least one of the codewords and at least one of the matrices;

receiving feedback from a plurality of user terminals;

determining an optimum codeword from the plurality of codewords by using the feedback, and determining an optimum user terminal from the plurality of user terminals;

multiplying data, which is to be transmitted to the optimum user terminal, by the optimum codeword and one of the plurality of matrices to precode the data to be transmitted; and inserting pilots into the precoded data to be transmitted and transmitting the data.

9. The method of claim 8, wherein at least one of the matrices is a diagonal matrix.

10. A base station comprising:
a receiver configured to receive feedback information from a plurality of user terminals; and
a codebook-based beamforming with code rotation (CBF-CR) circuit configured to
generate a first random variable corresponding to a Gaussian distribution;
generate a second random variable corresponding to a uniform distribution;
generate a plurality of beam elements by using the first random variable, the second random variable, spatial correlation between channels, and indexes of transmitting antennas;
form a beam by using the plurality of beam elements;
repeatedly perform the generating of the first random variable, the generating of the second random variable, the generating of the plurality of beam elements, and the forming of the beam, thereby forming a plurality of beams;
select an optimum beam from the plurality of beams;
multiply data to be transmitted by the optimum beam to precode the data to be transmitted; and
insert pilots into the precoded data to be transmitted and transmitting the data.

11. The base station of claim 10, the CBF-CR circuit comprising:
a codeword generating and grouping unit configured to generate a plurality of codewords;
a scheduler configured to determine an optimum codeword to generate a plurality of codebooks;
a modulation unit configured to modulate and code data to be transmitted;
a precoder configured to multiply the data by an optimum code vector; and
a pilot insertion unit configured to inset pilots into an output value from the precoder.

12. The base station of claim 10, wherein a number of the beam elements is the same as that of the transmitting antennas.

13. The base station of claim 10, wherein the CBF-CR circuit further is configured to normalize the plurality of beam elements.

14. The base station of claim 10, wherein one of the plurality of beam elements is generated using electric power of the rest of the beam elements except for the one of the plurality of beam elements.

15. The base station of claim 10, wherein the CBF-CR circuit further is configured to generate N codebooks by grouping the plurality of beam elements by Q and diversely use the beam elements with a change in time.

* * * * *